United States Patent
Churyumov (10) Patent No.: US 9,756,056 B2
(45) Date of Patent: Sep. 5, 2017

(54) APPARATUS AND METHOD FOR AUTHENTICATING A USER VIA MULTIPLE USER DEVICES

(71) Applicant: Anton Nikolaevich Churyumov, Moscow (RU)

(72) Inventor: Anton Nikolaevich Churyumov, Moscow (RU)

(*) Notice: Subject to any disclaimer, the term of this patent is extended or adjusted under 35 U.S.C. 154(b) by 73 days.

(21) Appl. No.: 14/890,399

(22) PCT Filed: Sep. 4, 2013

(86) PCT No.: PCT/RU2013/000769
§ 371 (c)(1),
(2) Date: Nov. 10, 2015

(87) PCT Pub. No.: WO2015/034384
PCT Pub. Date: Mar. 12, 2015

(65) Prior Publication Data
US 2016/0112437 A1    Apr. 21, 2016

(51) Int. Cl.
*H04L 29/06* (2006.01)
*G06F 21/43* (2013.01)

(52) U.S. Cl.
CPC .............. *H04L 63/12* (2013.01); *G06F 21/43* (2013.01); *H04L 63/00* (2013.01); *H04L 63/083* (2013.01); *H04L 63/0823* (2013.01); *H04L 63/105* (2013.01)

(58) Field of Classification Search
CPC ........ H04L 63/00; H04L 63/08; H04L 63/083; H04L 63/0853; H04L 63/0876; G06F 21/30; G06F 21/31; G06F 21/34; G06F 21/35
See application file for complete search history.

(56) References Cited

U.S. PATENT DOCUMENTS

| 6,430,407 B1 | 8/2002 | Turtiainen |
| 6,584,505 B1 * | 6/2003 | Howard ................. G06F 21/31 709/225 |
| 7,237,118 B2 | 6/2007 | Himberger et al. |

(Continued)

FOREIGN PATENT DOCUMENTS

| WO | 01/48674 A1 | 7/2001 |
| WO | 2010/064128 A2 | 6/2010 |

(Continued)

OTHER PUBLICATIONS

Accells, "Your Mobile ID for Smart Authentication", https://www.linkedin.com/company/accells, downloaded Aug. 12, 2015, 1 pg.

(Continued)

*Primary Examiner* — Eric W Shepperd
(74) *Attorney, Agent, or Firm* — Cooley LLP (57) ABSTRACT

A method includes forming, during access to a site, an association between a user and a first device. Contact information for a second device associated with the user is obtained. During a subsequent access to the site the first device is recognized. The user is prompted to authenticate without inputting identifying information. The user is authenticated at the site relying upon the association and a positively acknowledged message from the second device.

14 Claims, 4 Drawing Sheets

(56) References Cited

U.S. PATENT DOCUMENTS

| | | | |
|---|---|---|---|
| 7,266,595 | B1 | 9/2007 | Black et al. |
| 7,574,733 | B2 | 8/2009 | Woodhill |
| 7,836,487 | B2 | 11/2010 | Walker Pina et al. |
| 7,986,816 | B1* | 7/2011 | Hoanca .............. G06K 9/00597 |
| | | | 382/115 |
| 8,191,118 | B2 | 5/2012 | Kim et al. |
| 8,209,744 | B2 | 6/2012 | Zhu et al. |
| 8,261,089 | B2 | 9/2012 | Leon Cobos et al. |
| 8,286,227 | B1* | 10/2012 | Zheng ................ H04L 63/0853 |
| | | | 726/2 |
| 8,346,672 | B1 | 1/2013 | Weiner et al. |
| 8,365,258 | B2 | 1/2013 | Dispensa |
| 8,433,914 | B1 | 4/2013 | Philpott et al. |
| 8,732,475 | B2* | 5/2014 | Fahrny .................... H04L 63/08 |
| | | | 713/176 |
| 8,763,101 | B2* | 6/2014 | Counterman ......... H04W 12/06 |
| | | | 713/168 |
| 2003/0204726 | A1 | 10/2003 | Kefford et al. |
| 2004/0030935 | A1 | 2/2004 | Kai |
| 2004/0250135 | A1 | 12/2004 | Haddad et al. |
| 2007/0203850 | A1 | 8/2007 | Singh et al. |
| 2007/0238505 | A1* | 10/2007 | Okada ..................... G07F 17/32 |
| | | | 463/16 |
| 2008/0086764 | A1 | 4/2008 | Kulkarni et al. |
| 2008/0240440 | A1 | 10/2008 | Rose et al. |
| 2010/0024024 | A1 | 1/2010 | Siourthas et al. |
| 2011/0087887 | A1* | 4/2011 | Luft ...................... H04L 9/3247 |
| | | | 713/178 |
| 2011/0219427 | A1 | 9/2011 | Hito et al. |
| 2012/0240203 | A1 | 9/2012 | Kling |
| 2012/0295587 | A1 | 11/2012 | Paya et al. |
| 2013/0091544 | A1 | 4/2013 | Obergeide et al. |
| 2013/0198516 | A1 | 8/2013 | Fenton et al. |
| 2014/0245389 | A1* | 8/2014 | Oberheide .......... H04L 63/0815 |
| | | | 726/3 |
| 2014/0298421 | A1* | 10/2014 | Johnson ................ H04L 63/083 |
| | | | 726/4 |
| 2014/0316991 | A1* | 10/2014 | Moshal ............. G06F 17/30879 |
| | | | 705/64 |
| 2015/0046989 | A1* | 2/2015 | Oberheide .............. G06F 21/44 |
| | | | 726/6 |
| 2015/0235017 | A1* | 8/2015 | Oberheide .............. G06F 21/32 |
| | | | 726/6 |
| 2016/0255505 | A1* | 9/2016 | Oberheide ............. G06Q 20/32 |
| | | | 726/7 |

FOREIGN PATENT DOCUMENTS

| | | |
|---|---|---|
| WO | 2012/131172 A1 | 10/2012 |
| WO | 2013/063326 A1 | 5/2013 |

OTHER PUBLICATIONS

Authentify, "Authentify 2CHK", http://authentify.com/products/authentify-2chk/, downloaded Aug. 12, 2015, 1 pg.
Clef, "Clef is Secure Two-Factor—Built for Consumers", https://getclef.com/features/, downloaded Aug. 12, 2015, 5 pgs.
Duosecurity, "Guide to Two-Factor Authentication", https://guide.duosecurity.com/, downloaded Aug. 12, 2015, 3 pgs.
Launchkey, "How It Works", https://launchkey.com/how-it-works, downloaded Aug. 12, 2015, 5 pgs.
Mepin, "We Secure Your Identity and Payments", https://www.mepin.com/, downloaded Aug. 12, 2015, 1 pg.
Microsoft, "What does Azure Multi-Factor Authentication Mean for Me?", https://azure.microsoft.com/en-us/documentation/articles/multi-factor-authentication-end-user/, downloaded Aug. 12, 2015, 3 pgs.
Solidpass, "Next Generation Authentication", http://www2.solidpass.com/, downloaded Aug. 12, 2015, 2 pgs.
Toopher, "A Simple Tool with Sophisticated Features so You Can Focus on What Matters", https://lastpass.com/toopher/, downloaded Aug. 12, 2015, 1 pg.
Weir, Catherine S., et al. "User Perceptions of Security, Convenience and Usability for Ebanking Authentication Tokens", Computers & Security, 28.1 (2009): 47-62.
Wikipedia, "HTTP Cookie", https://en.wikipedia.org/wiki/HTTP_cookie, downloaded Aug. 12, 2015, 10 pgs.

* cited by examiner

APPARATUS AND METHOD FOR AUTHENTICATING A USER VIA MULTIPLE USER DEVICES

CROSS REFERENCE TO RELATED APPLICATION

This application claims priority to International Patent Application no. PCT/RU2013/000769 filed Sep. 4, 2013, the contents of which are incorporated herein by reference.

FIELD OF THE INVENTION

This invention relates generally to authentication of a user in a networked environment. More particularly, this invention relates to authenticating a user via multiple user devices.

BACKGROUND OF THE INVENTION

Passwords have long been and still remain the main, and in most cases, the only, authentication method for online services on the Internet. This is largely due to ease of deployment by website owners and accessibility to all users. However, this method of authentication is vulnerable to a number of weaknesses. For example, passwords should be long enough to be secure, while being short enough to be memorable. Passwords should look random to be secure, while looking meaningful to be memorable. Passwords are susceptible to phishing and key logging attacks. Once stolen, passwords allow an attacker to gain access to the system the password is supposed to protect by impersonating the legitimate user.

With the rapid movement of important activities (like banking) to the online world, along with the migration of less technically savvy people to the online world, the previously described weaknesses of passwords make them increasingly unsuitable for user authentication.

One straightforward solution to this problem is based on reformulating the existing problem as "just a password is not enough" and adding more factors of authentication. There are three known factors of authentication:

knowledge factor—something the user knows;
possession factor—something the user has; and
inherence factor—something the user is.

A password is a knowledge factor. Two factor authentication (TFA) requires the user to present two pieces of evidence that belong to two of the three categories above (factors).

The second factor that is typically added is a possession factor. Many current TFA mechanisms require the use of a security token, a small hardware device that is issued to users and displays a seemingly random number that changes periodically. When logging in to a website, the user in addition to the traditional username and password has to enter the number displayed on the security token (access code). One example of such token is RSA SecureID®.

Another TFA implementation uses a USB token that needs to be plugged into a USB port of a computer. The token supplies the access code directly to the computer saving the user the need to re-type the access code by hand.

Security schemes based on hardware tokens are successful in strengthening security, however they have not enjoyed mass market adoption due to the obvious inconvenience for the user of carrying a rarely used device (and in some implementations, having to re-type numbers every time a user logs in) and the cost of deployment of such a scheme.

The inconvenience of carrying around another device is mitigated and deployment cost is substantially reduced by use of software tokens that are implemented as Smartphone applications installed on mobile devices that users already carry. One example of such a software token is Google Authenticator®. It is a mobile application for Android®, iOS®, and BlackBerry® Smartphone platforms that generates time-based one-time passwords, just like dedicated hardware tokens. In this scheme, the mobile phone is a possession factor. No need to buy another device, no need to carry another device, but the user still has to transcribe the access code from his mobile phone screen to a separate computer.

Probably the most widely used (to date) TFA method is based on SMS codes. After a user successfully presents a knowledge factor (e.g., username and password), a text message is sent to his mobile phone. The message contains a code that the user needs to transcribe back to the browser window on a separate computer. This solution is more accessible than soft tokens since it works on all mobile phones, not just Smartphones, and doesn't require installing any applications on the mobile phone. However, it is still inconvenient from a user's perspective as it requires one to obtain codes from the screen of one device and type them into another device. This makes for a lengthy login. The approach also incurs costs for the provider who has to pay for the SMS message sent to user phones.

A new TFA method builds on the growing adoption of Smartphones, the always connected, always-with-me devices. An application is installed on a user's Smartphone. After successful verification of a knowledge factor (e.g., a user name and a password) through a computer, a push notification is sent to the user's Smartphone. The application wakes up and asks the user to confirm login. The user taps the "Confirm" button and access is granted on the user's computer. This method is already employed by companies Toopher®, Duo Security®, Accells®, and Phonefactor®. By eliminating the need to re-type codes, this new TFA method makes a user's life much easier than older TFA methods. However, the passwords still keep their place as the primary authentication factor.

In view of the foregoing, it would be desirable to provide a more convenient, and yet still secure, authentication technique.

SUMMARY OF THE INVENTION

A method includes forming, during access to a site, an association between a user and a first device. Contact information for a second device associated with the user is obtained. During a subsequent access to the site the first device is recognized. The user is prompted to authenticate without inputting identifying information. The user is authenticated at the site relying upon the association and a positively acknowledged message from the second device.

A non-transitory computer readable storage medium includes instructions executed by a processor to send a code associated with a user to a server. A site access confirmation request is received from the server. A response to the site access confirmation request is received from the user. The response is sent to the server. The response denies or facilitates site access.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
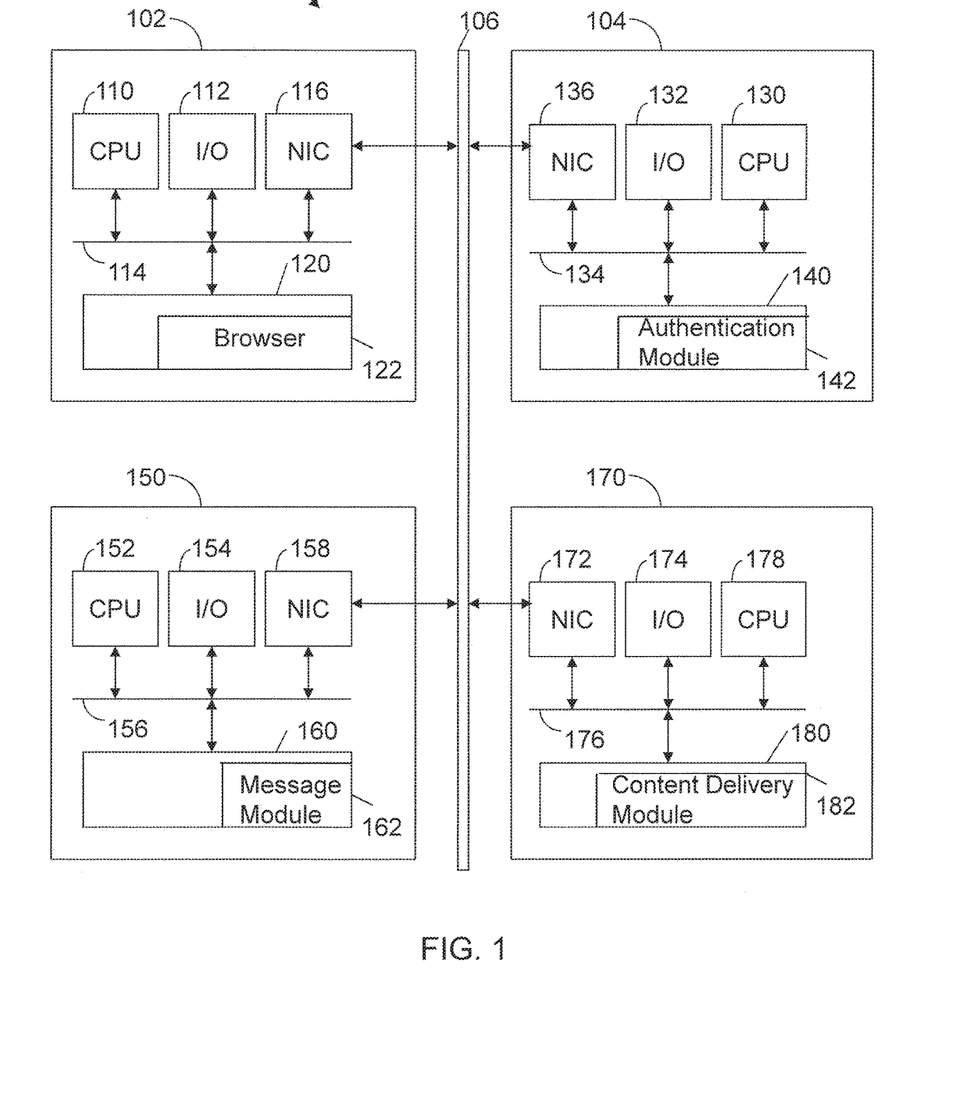
FIG. 1 illustrates a system configured in accordance with an embodiment of the invention.

FIG. 1 illustrates a system 100 configured in accordance with an embodiment of the invention. The system 100 includes a first user device 102 connected to a server 104 via a network 106, which may be any wired or wireless network. Network 106 may include any number of wired or wireless networks operating in conjunction or in parallel. The networks can be built on same or different technologies.

The first user device 102 includes standard components, such as a central processing unit connected to input/output devices 112 via a bus 114. The input/output devices 112 may include a touch display, keyboard, mouse and the like. A network interface circuit 116 is also connected to the bus 114. A memory 120 is also connected to the bus. The memory may store a browser 122 to support networked communications. The first device 102 may be a desktop computer, a laptop computer, tablet, a Smartphone, a mobile phone and the like.

The server 104 also includes standard components, such as a central processing unit 130 and input/output devices 132 connected via a bus 134. A network interface circuit 136 is also connected to the bus 134. A memory 140, connected to the bus 134, stores an authentication module 142, which implements operations of the invention. That is, the authentication module 142 includes executable instructions to implement operations, such as those discussed below in connection with FIGS. 2 and 4.

The system 100 also includes a second user device 150. The second user device 150 also includes standard components, such as a central processing unit 152 connected to input/output devices 154 via a bus 156. A network interface circuit 158 is also connected to bus 156. A memory 160 connected to bus 156 stores one or more programs, such as a messaging module 162. The messaging module 162 supports various messaging protocols, such as Short Message Service (SMS) texting, email, push notifications and the like. As discussed below, a user is authenticated in the system 100 through demonstrated possession of both the first user device 102 and the second user device 150. The second user device 150 may be a desktop computer, a laptop computer, tablet, a Smartphone, a mobile phone and the like. However, typically the second user device 150 is a Smartphone or other mobile phone.

An embodiment of the invention may include a second server 170. The second server 170 also includes standard components, such as a central processing unit 178 and input/output devices 174 connected via a bus 176. A network interface circuit 172 provides connectivity to network 106. A memory 180 connected to bus 176 stores a content delivery module 182. The content delivery module 182 pushes content to the first user device 102 and/or the second user device 150. The content delivery module 182 also communicates with the authentication module 142 to authenticate a user, as discussed below.

Figure 2:
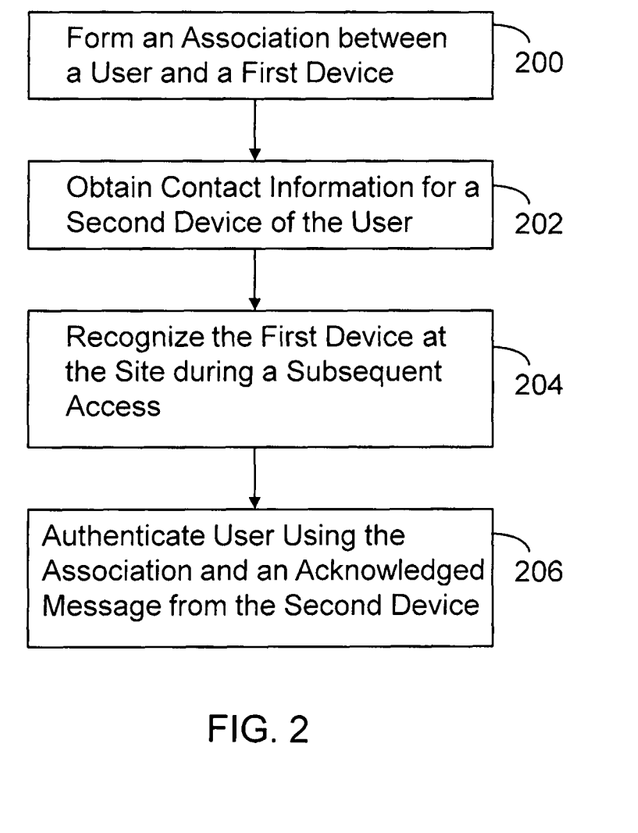
FIG. 2 illustrates processing operations associated with an embodiment of the invention.

FIG. 2 illustrates processing operations associated with an embodiment of the authentication module 142. Initially, an association is formed between a user and a first device 200. This association may involve a standard authentication operation utilizing a username and a password. Once authenticated, the association may be memorized by a cookie written from the authentication module 142 to the client device 102.

The next operation of FIG. 2 is to obtain contact information for a second device of the user 202. The contact information may be obtained by a script delivered from the authentication module 142 to the client device 102. The script prompts the user for contact information related to a second device (e.g., device 150) owned by the user. The contact information may be a telephone number, registration identification for push notifications and the like. Alternately, device information may be obtained via a QR code, as discussed below.

The next operation of FIG. 2 is to recognize the first device at the site during a subsequent access to the site 204. For example, if the user device 102 accesses server 104 a second time, the authentication module 142 automatically reads any stored cookies previously written to the user device 102 by the authentication module 142. If such an identifier is present, then the authentication module 142 recognizes the user. That is, the authentication module 142 automatically links the identifier with the user (e.g., a username). Observe here that the recognition is achieved without the user entering identifying information, such as a user name and password. While such recognition is convenient for a user, it may not provide adequate authentication. Consequently, the authentication module 142 performs an additional operation of authenticating the user using an association (e.g., the cookie association with the user name) and an acknowledged message from the second device 206. That is, authentication module 142 initiates a message to the second device (e.g., device 150).

Figure 3:
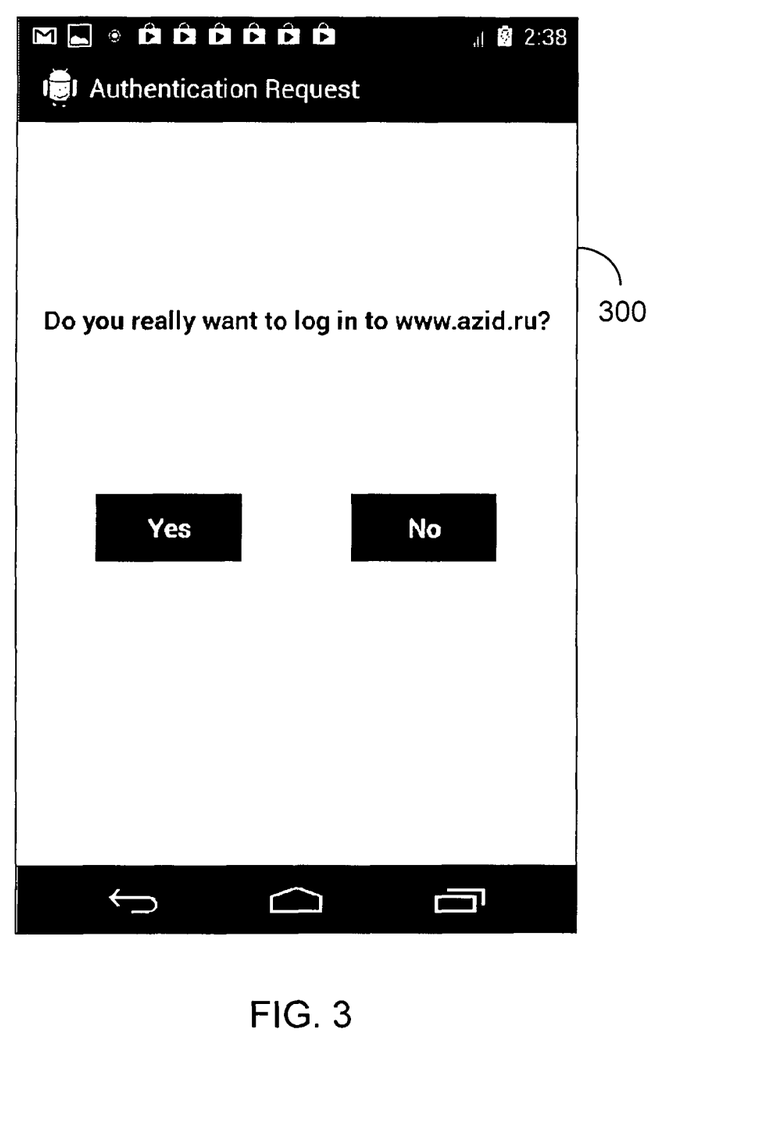
FIG. 3 illustrates a user interface that may be utilized in accordance with an embodiment of the invention.

FIG. 3 illustrates a user interface 300 that may be used in this operation. The user interface 300 is displayed on the second device. The user interface has a simple prompt to confirm that the user wants to access the specified site. If the user answers in the affirmative (e.g., with a single gesture applied to the "Yes" button), the authentication module 142 receives a message and allows access to the site. Observe here that the user of a first device (e.g., 102) has accessed the site (e.g., sever 104), has been automatically recognized by the site (without entry of a username and password), has received a message on a second device (e.g., device 150) to confirm that access to the site should be allowed. At this point, the authentication module 142 allows the user to access the site and is fully recognized at the site, even though the user has not entered a username and password.

This authentication technique may be deployed on a single server. Alternately, this authentication technique may be deployed across several servers, as shown in connection with FIG. 4.

Figure 4:
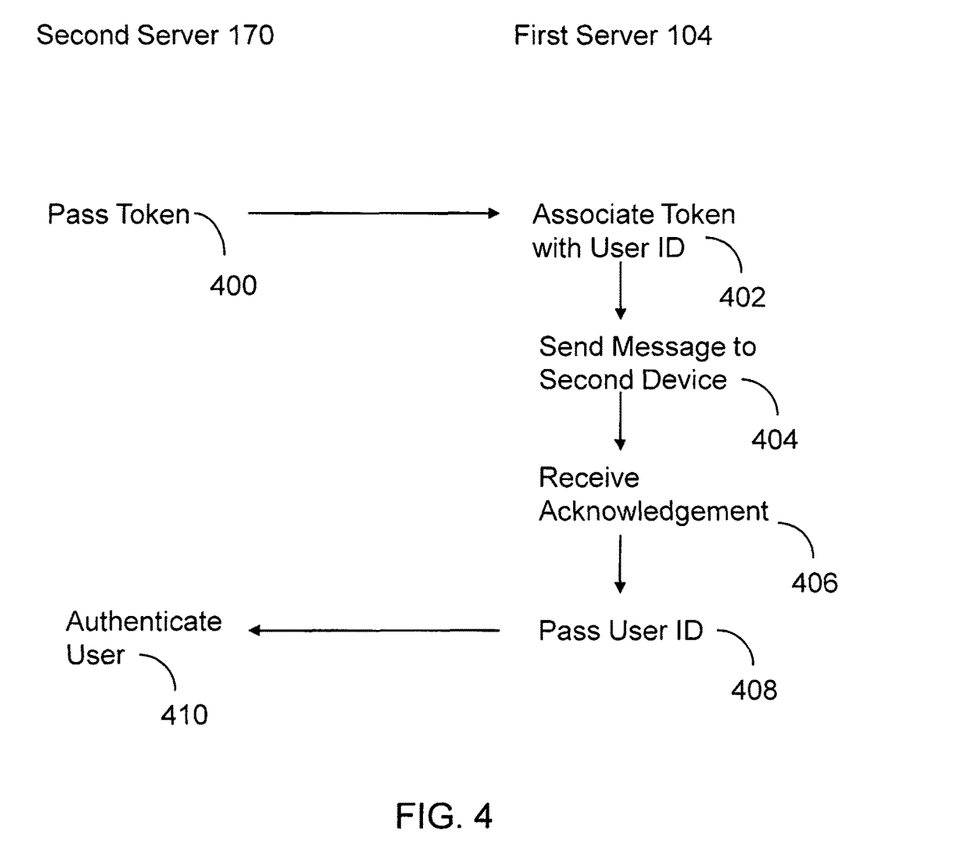
FIG. 4 illustrates alternate processing operations utilized in accordance with an embodiment of the invention.

FIG. 4 illustrates operations performed between the second server 170 and the first server 104. In this example, the second server 170 uses the first server 104 for authentication operations. The second server may initially perform the first operation of FIG. 2; namely, form an association between a user and a first device 200. That association may be reflected in a token, such as a user identification. The authentication module 142 may maintain contact information for the second device of the user. That is, the authentication module 142 may have a database with records characterizing a second device of a user. The second device is identified through a user ID agreed to between the authentication module and the second server 170.

A subsequent access by the user at the second server 170 results in the second server 170 passing an identifying token 400. The token is processed at the first server 104 to associate the token with user identification 402. The user identification is used to send a message to the second device owned by the user 404. If the authentication module 142 receives an acknowledgement 406, user identification is passed 408 to the second server 170. This allows the second server 170 to authenticate the user 410. That is, the second server has received acknowledgement that the user has authorized the session.

Variations on this approach are possible. For example, a widget may be provided to the content delivery module 182, which allows the authentication module 104 to read a cookie on the first device 102.

A single implementation of the invention has been fully described. Those skilled in the art will appreciate that any number of variations on this implementation are possible. For example, the initial authentication of a user may be performed in any number of ways. That is, the operations of block 200 of FIG. 2 may be performed in a number of ways, including:
- presenting a username and password;
- presenting a client SSL certificate;
- using a one-time password;
- confirming a code sent to a user's email address; and
- confirming a code sent to a user's mobile phone over text message or any combination thereof. The fact that a user is communicating with the service or site through the same device that was used for initial authentication can be established by any method allowed by the nature of the communication link, including:
- setting a cookie that uniquely identifies a user's first device after initial authentication and checking for presence and integrity of this cookie during subsequent authentications;
- checking that the IP address of a first device is the same as the IP address used during initial authentication;
- checking that the MAC address of a first device is the same as the MAC address used during initial authentication; and
- generating and saving in browser storage (as specified in the HTML5 specification) a unique browser identifier during initial authentication, and reading and sending this identifier over to the service during subsequent authentications;

or any combination thereof

The second device might be a mobile computing device such as a Smartphone with a special application installed. The application is able to process at least authentication requests. It is also personalized to the specific user, e.g., it is able to supply a unique ID of the second device (or of an application installation) when communicating with the service, and that ID is linked to the user. Methods of personalization include but are not limited to:
- hard coding a user ID inside the application's executable code and supplying each user with an individual application;
- generating a random or hardware based device ID and linking it to the user ID by a special process, that process might comprise for example:
  - generating a code associated with the user,
  - storing that code on the server,
  - encoding that code as a 2D barcode, such as QR code, and displaying it on user's computer screen when the user is already authenticated (for example, after initial authentication),
  - scanning the 2D barcode from a computer screen by the camera of the second device,
  - sending the code read from the barcode, together with the device ID, to the service,
  - matching the code received from second device with the user and linking the device ID to the user ID;
- entering a username and password on the second device; and
- using any external hardware (such as smartcards) or storage (such as microSD cards) personalized to the user and having the application access or communicate with the personalized hardware or storage, including wireless communication, such as NFC.

In this context, when the purported user is already on line with the service through his first device, the service would confirm the user's authenticity by trying to contact him on his second device and asking him to confirm that it is really him on the first device. The confirmation request can include an indication of the service or action the purported user is trying to access through the first device and any other information that would help the user match the request with his activity on the first device. If the second device is a mobile device such as a Smartphone or tablet, the confirmation request can be delivered by a push notification service such as Google Cloud Messaging® on Android® or Apple Push Notification® on iOS®. Another way to deliver the confirmation request is by sending a SMS message (text or binary message) to the user's second device if it supports cell service.

After the confirmation request is delivered to the second device, the second device presents the request to the user in any form that the user can perceive. For example, it can display the request on the screen of the second device (such as in FIG. 3) or can read it audibly. The request presented to the user seeks confirmation of his activity on the first device.

The second device accepts a user's response to the confirmation request. The response can be given, for example, by tapping "Yes" (or equivalent such as "Approve", "Confirm") or "No" (or equivalent such as "Reject", "Deny") button on the touch screen or pressing a hardware button of the second device or pronouncing the response audibly. If the user replies "No" (or equivalent), the second device can optionally ask the user if he wants to report an unauthorized access attempt. A user's response may be sent, for example, over an IP network by calling a predefined URL of the service, or by sending a text or binary SMS to a predefined number.

When the service receives a user's response from the second device, it knows with far greater certainty whether the user on the first device is authentic, than it would know without confirmation through the second device. The service uses this knowledge (maybe combined with other knowledge and criteria) to grant or deny access to the user on the first device.

The authentication method of this invention relies on evidence that the user still controls two devices that were previously proven to be controlled by this user, i.e. two possession factors. This is different from current TFA methods that typically rely on one knowledge factor and one possession factor. Although the total number of factors in the method of this invention is also two, it is not what is traditionally called TFA because the presently accepted definition of TFA requires the two factors to be from different categories of the three categories available: knowledge, possession, and inherence.

The disclosed authentication based on two possession factors is advantageous to traditional knowledge plus possession TFA in several respects. First, it is easier to use. Authentication at a site with a knowledge factor is only performed once, if ever. Thus, users don't have to remember passwords, users don't risk forgetting a password, and users don't have to type a password every time they want to access a service. Next, the technique may be more secure for three reasons. First, passwords are detachable pieces of evidence: they are easily detached from their owner, can be copied an infinite number of times and may be used from any location in the world without knowledge of their legitimate owner. Devices, such as mobile phones, although not an integral part of a user's body, are closely monitored so their loss or theft won't go unnoticed. Second, users tend to choose weaker, easier to remember passwords, when they are allowed to, effectively eliminating usefulness of a password and leaving only one working factor. Third, passwords are vulnerable to phishing and key logging attacks. After initial authentication, there is no typing when using the method of this invention; hence phishing and key logging are simply inapplicable.

When even stronger authentication is required, techniques of the invention can be supplemented by one or more knowledge factors, such as:
  if the first device is a computer, it can be protected by a logon password;
  if the second device is a mobile device, it can be additionally secured by a PIN code; and
  the traditional username/password entry can be added to the authentication sequence.

A special case of the present invention is a situation where a first device and a second device are the same physical device running two distinct software programs that are recognized by the service as separate communication endpoints. For example, a first device can be a mobile web browser on a mobile device, and the second device can be an application running on the same mobile device. Such setting can be used when security requirements allow. A mandatory PIN or password to access the application (second device) can be a reasonable measure to strengthen security in this setting.

Observe that the technique of the invention permanently pairs a first device with a user. Consequently, the first device is a sufficient indication of the user; this sufficient indication is further confirmed by making a request to the second device. Observe that this pairing is done once, but may then be used any number of times. Unlike prior art techniques, the pairing does not end when the user closes the browser.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:
1. A method, comprising:
  forming, during access to a server, an association between a user and a first device used to access the server, wherein the association constitutes a first possession factor linking the user to the first device without reliance upon all things known by the user;
  sending a code to the first device;
  receiving the code and contact information for a second device associated with the user, wherein the contact information facilitates a second possession factor linking the user to the second device without reliance upon all things known by the user except for the contact information;
  recognizing, during a subsequent access to the server, the first device and therefore establish the first possession factor;
  sending a message to the second device in response to recognizing;
  obtaining a positively acknowledged message from the second device and therefore establish the second possession factor; and
  authenticating the user based upon the first possession factor and the second possession factor without reliance upon all things known by the user.

2. The method of claim 1 wherein forming includes, in addition to the association, initially authenticating the user.

3. The method of claim 2 wherein initially authenticating the user is achieved by one or more of:
  receiving a username and password,
  receiving a client SSL certificate,
  receiving a one-time password,
  confirming a code sent to a user email address, and
  confirming a code sent to the second device.

4. The method of claim 1 wherein recognizing includes one or more of:
  reading a cookie on the first device that uniquely identifies the first device,
  checking the IP address of the first device,
  checking the MAC address of the first device, and
  checking a unique browser identifier.

5. The method of claim 1 wherein the message includes a single gesture prompt to establish the positively acknowledged message.

6. The method of claim 1 wherein sending and receiving rely upon Internet Protocol network communications.

7. The method of claim 1 wherein sending and receiving rely upon short message service communications.

8. The method of claim 1 wherein authenticating includes:
passing a token from the server to a first server;
associating, at the first server, the token with user identification;
sending a message from the first server to the second device;
receiving, at the first server, a positive acknowledgement of the message; and
passing the user identification from the first server to the server.

9. The method of claim 1 wherein the first device and second device are the same physical device running two distinct software programs that are recognized by the server as separate communication endpoints.

10. The method of claim 1 wherein the second device is identified by one or more of:
a hardcoded user ID associated with an application on the second device,
a device ID for the second device,
a username and password on the second device, and
external hardware associated with the second device.

11. The method of claim 1 further comprising receiving a negatively acknowledged message from the second device.

12. The method of claim 11 wherein the negatively acknowledged message reports an unauthorized access attempt.

13. The method of claim 1 wherein the contact information comprises one or more of:
a telephone number, and
a push notification address.

14. The method of claim 1 wherein sending includes sending QR code for display by the first device.

* * * * *